United States Patent [19]

Ito

[11] Patent Number: 5,196,790
[45] Date of Patent: Mar. 23, 1993

[54] APPARATUS FOR DETECTING REVOLUTION COUNTS OF AN ELECTRIC MOTOR OR GENERATOR

[75] Inventor: Norihiko Ito, Saitama, Japan

[73] Assignee: Pioneer Electronic Corporation, Tokyo, Japan

[21] Appl. No.: 779,875

[22] Filed: Oct. 21, 1991

[30] Foreign Application Priority Data

Jul. 7, 1991 [JP] Japan .................................. 3-136134

[51] Int. Cl.[5] ........................ G01P 3/46; G01R 31/02; H02H 3/04; H02K 11/00
[52] U.S. Cl. .................................. 324/177; 318/490
[58] Field of Search ................ 324/163, 177; 318/650, 318/490

[56] References Cited

U.S. PATENT DOCUMENTS 2,654,860 10/1953 Lewis .................................. 324/177

Primary Examiner—Walter E. Snow
Attorney, Agent, or Firm—Sughrue, Mion, Zinn, Macpeak & Seas

[57] ABSTRACT

A revolution counts detection apparatus comprises a detector for detecting the induced voltage of an electric motor, a capacitor for storing charges, and a charging means for charging the capacitor on the basis of the detected induced voltage. Further, a generator for generating a voltage corresponding to the revolution velocity of a revolving body can be used instead of the electric motor. Whereby, the revolution counts of the motor or the generator can be detected as a voltage across the capacitor.

5 Claims, 3 Drawing Sheets

5,196,790

APPARATUS FOR DETECTING REVOLUTION COUNTS OF AN ELECTRIC MOTOR OR GENERATOR

BACKGROUND OF THE INVENTION

The present invention relates to a revolution counts detection apparatus for detecting the revolution counts.

FIG. 5 shows the conventional apparatus for detecting the revolution counts of an electric motor.

In a revolution counts detection apparatus 50 for detecting the revolution counts of an electric motor M, a pulse generator 51 generates, as an output thereof, a pulse signal corresponding to revolution of the electric motor M. A digital counter 52 counts the number of pulses of the pulse signal produced from the pulse generator 51 so as to obtain the number of revolutions.

In the case of performing control such as positional control or the like by using the revolution counts obtained by the revolution counts detection apparatus 50, the revolution counts is converted into an analog signal again by using a D/A converter.

In the foregoing conventional revolution counts detection apparatus, there has been a problem in that since signal conversion is once performed into a digital signal to thereby obtain the revolution counts, the apparatus configuration is complicated to make the cost high.

Further, in order to use the output signal of the revolution counts detection apparatus to perform control, caused is a new problem in that it becomes necessary to use a D/A converter for converting into an analog signal again to make the cost higher.

SUMMARY OF THE INVENTION

It is therefore an object of the present invention to provide an apparatus for detecting the revolution counts, which is simple in configuration and the output signal of which can be easily used as a controlling signal.

FIG. 1 is a diagram for explaining the principle of the first aspect of the invention.

A revolution counts detection apparatus 100A is constituted by a detection means 102 for detecting the induced voltage of an electric motor 101, a capacitor 104 for storing charges, and a charging means 103 for charging the capacitor 104 on the basis of the detected induced voltage.

FIG. 2 is a diagram for explaining the principle of the second aspect of the invention.

A revolution counts detection apparatus 100B is constituted by a generator 106 for generating a voltage corresponding to the number of revolutions of a revolving body 105, a capacitor 109 for storing charges, a detection means 107 for detecting the voltage generated from the generator 106, and a charging means 108 for charging the capacitor on the basis of the detected voltage.

According to the first aspect of the invention, the detection means 102 detects the induced voltage of the electric motor 101, and the charging means 103 charges the capacitor 104 on the basis of the detected induced voltage.

As a result, charges corresponding to the counted number of revolutions of the electric motor are stored in the capacitor, and therefore the revolution counts of the electric motor can be detected by the measurement of the voltage across the capacitor.

According to the second aspect of the invention, the generator 106 generates a voltage corresponding to the number of revolutions of the revolving body 105, and the detection means 107 detects the voltage. The charging means 108 charges the capacitor 109 on the basis of the detected voltage.

As a result, charges corresponding to the revolution counts of the revolving body are stored in the capacitor, and therefore the revolution counts of the revolving body can be detected by the measurement of the voltage across the capacitor.

DESCRIPTION OF THE PREFERRED EMBODIMENTS

Next, referring to FIGS. 3 and 4, embodiments of the present invention will be described.

Figure 3:
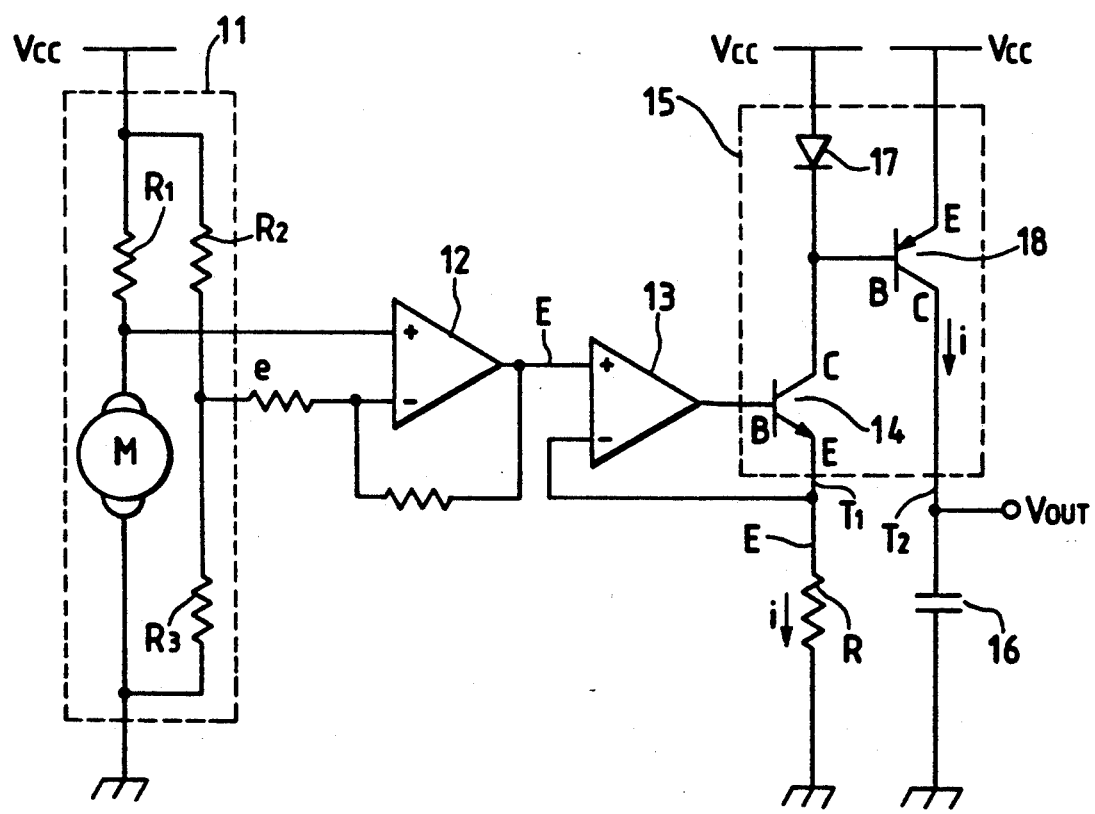
FIG. 3 shows a circuit diagram showing an embodiment of the first invention.

FIG. 3 is a diagram showing the fundamental configuration of the revolution counts detection apparatus according to the first invention.

A revolution counts detection apparatus 10 is constituted by a bridge circuit 11, a first operational amplifier 12, a second operational amplifier 13, a current mirror circuit 15, a resistor R, and a capacitor 16. In the bridge circuit 11, one side is constituted by an electric motor M and the other three sides are constituted by resistors $R_1$, $R_2$, and $R_3$ respectively. The first operational amplifier 12 amplifies an induced voltage generated at the signal detection end of the bridge circuit 11, and outputs the voltage E as an amplified voltage E. The second operational amplifier 13 receives the amplified voltage E at its non-inverted terminal. The current mirror circuit 15 has an NPN-type first transistor, the base terminal of which is connected to the output terminal of the second operational amplifier 13. The current mirror circuit 15 further has a first output terminal $T_1$ connected to the collector C of the first transistor, and a second output terminal $T_2$ connected to one terminal of the capacitor 16, so that an output voltage at the first output terminal $T_1$ is made to be equal to the amplified voltage E on the basis of the output signal of the second operational amplifier, and a charging current is outputted through the second output terminal $T_2$. One and the other terminals of the resistor R are connected to the first output terminal $T_1$ and to the ground respectively. The other terminal of the capacitor 16 is connected to the ground.

The current mirror circuit 15 further has a diode 17 connected forwards between a power source $V_{cc}$ and the collector C of the first transistor, and a PNP-type second transistor 18. The base B of the second transistor 18 is connected to a connection point between the diode 17 and the collector C of the first transistor 14, the emitter is connected to the power source $V_{cc}$, and the collector is connected to the second output terminal $T_2$, respectively.

Next, the operation of the revolution counts detection apparatus of the invention will be described.

The first operational amplifier 12 detects the induced voltage e generated on the basis of the induced electromotive force of the electric motor in the bridge circuit 11, and outputs the detected voltage as the amplified voltage E. The second operational amplifier 13 outputs a voltage equal to the amplified voltage E from the first output terminal so that the voltage is applied to the resistor R. As a result, a current i flows between the power source $V_{cc}$ and the ground through the diode 17 and the collector C and emitter E of the first transistor 14 in the current mirror circuit 15, so that a charging current equal to the current i flows as a mirror current from the second output terminal $T_2$ of the current mirror circuit so that the capacitor 16 is charged by this current i. As a result, the revolution counts of the electric motor can be detected because it is proportional to the induced voltage $V_{OUT}$ of the capacitor.

Description will be made under in detail as to the relation between the induced voltage $V_{OUT}$ of the capacitor 16 and the revolution counts N of the electric motor.

The number of revolutions of the electric motor per minute can be expressed as follows by using the angular velocity $\omega$ of the electric motor.

$$n = \omega/2\pi \quad (1)$$

The revolution counts N of the electric motor is therefore expressed as follows.

$$N = k_1 \int \omega \, dt \quad (2)$$

where the proportional constant $K_1 = \frac{1}{2}\pi$.

Since the induced electromotive force $E_m$ of an electric motor is proportional to the angular velocity $\omega$ of the electric motor, the revolution counts N of the electric motor is expressed by the following expression obtained through the transformation of the expression (2).

$$N = k_2 \int E_m \, dt \quad (3)$$

Here, the expression (3) will be described.
The induced electromotive force $E_m$ (V) can be expressed as follows.

$$E_m = (z/2a) \cdot (2P \cdot \phi \cdot n/60) \quad (4)$$
$$= (z \cdot P \cdot \phi \cdot n/a \cdot 60)$$

where z represents the total number of conductors of an armature, a represents the number of parallel circuits, 2P represents the number of magnetic poles, and $\phi$ represents magnetic flux per pole.

If $(z \cdot P/a \cdot 60)$ k in the expression (1), the induced electromotive force E'' is expressed as follows.

$$E_m = k \cdot \phi \cdot n \quad (5)$$

The number of revolutions n is therefore expressed as follows.

$$n = E_m/(k \cdot \phi) \quad (6)$$

The proportional constant $K_2$ in the expression (3) is therefore as follows.

$$k_2 = 1/(k \cdot \phi)$$

On the other hand, assume that the current i is made to flow into the resistor R by the induced electromotive force $E_m$. Here, $E_m = i \cdot R$, and when this expression is substituted into the expression (3), the following expression is obtained.

$$N = k_3 \int i \, dt \quad (7)$$

where $k_3 = k_2 \cdot R$.

Here, if charges to be stored in the capacitor is represented by Q when the capacitor is charged by a current i flowing in the capacitor, the current i is expressed as follows.

$$i = dQ/dt \quad (8)$$

If the expression (8) is substituted into the expression (7), the following expression is obtained.

$$\begin{aligned} N &= k_3 \int dQ/dt \, dt \\ &= k_3 \int dQ \\ &= k_3 Q \end{aligned} \quad (9)$$

Here, if the capacity of the capacitor is represented by C and the voltage across the terminals of the capacitor is represented by $V_{OUT}$, $Q = C \cdot V_{OUT}$. Accordingly, the following expression is obtained.

$$N = k_3 \cdot C \cdot V_{OUT} \quad (10)$$

Since the capacitance C of the capacitor is fixed, the following expression is obtained.

$$N = k_4 \cdot V_{OUT} \quad (11)$$

where $k_4 = k_3 \cdot C$.

The counted number of revolutions N of the electric motor is therefore proportional to the voltage $V_{OUT}$ across the terminals of the capacitor, and if the proportional constant $K_4$ is obtained in advance, the counted number of revolutions of the electric motor can be obtained from the voltage across the terminals of the capacitor. Further, since the counted number of revolutions is produced in the form of a voltage, and the signal can be used as it is for other control such as positional control or the like.

Figure 4:
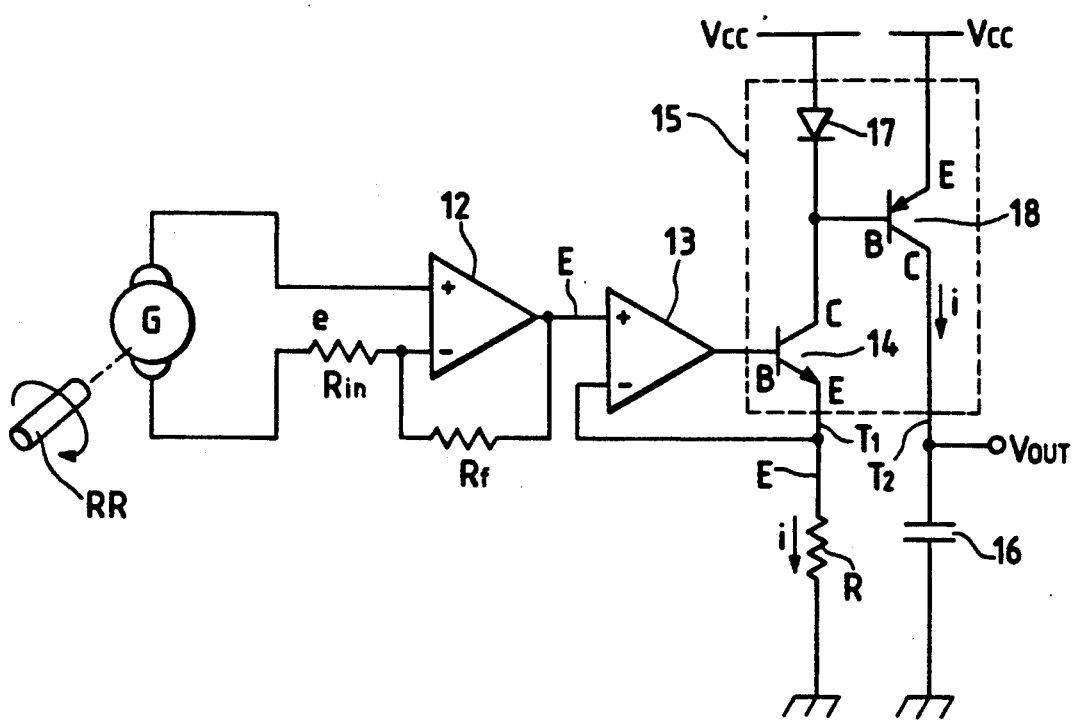
FIG. 4 shows a circuit diagram showing an embodiment of the second invention.
Figure 5:
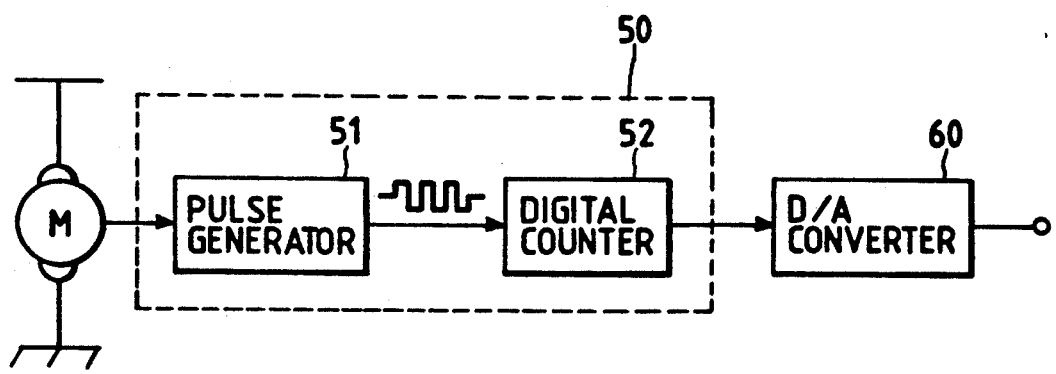
FIG. 5 shows a block diagram showing the fundamental configuration of the conventional apparatus for detecting the revolution counts.

FIG. 4 is a circuit diagram showing the configuration of an embodiment of the second invention.

Figure 1:
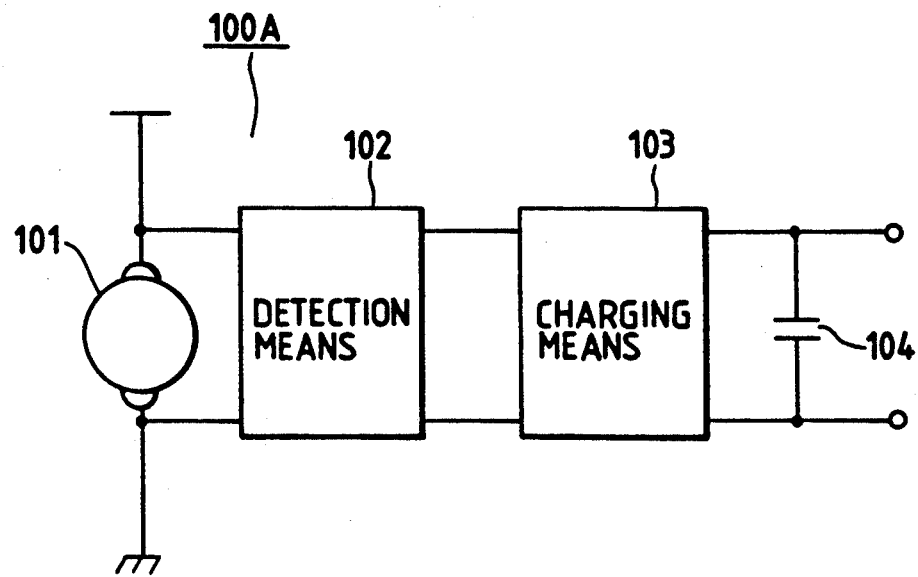
FIG. 1 shows a diagram for explaining the principle of the first aspect of the invention.
Figure 2:
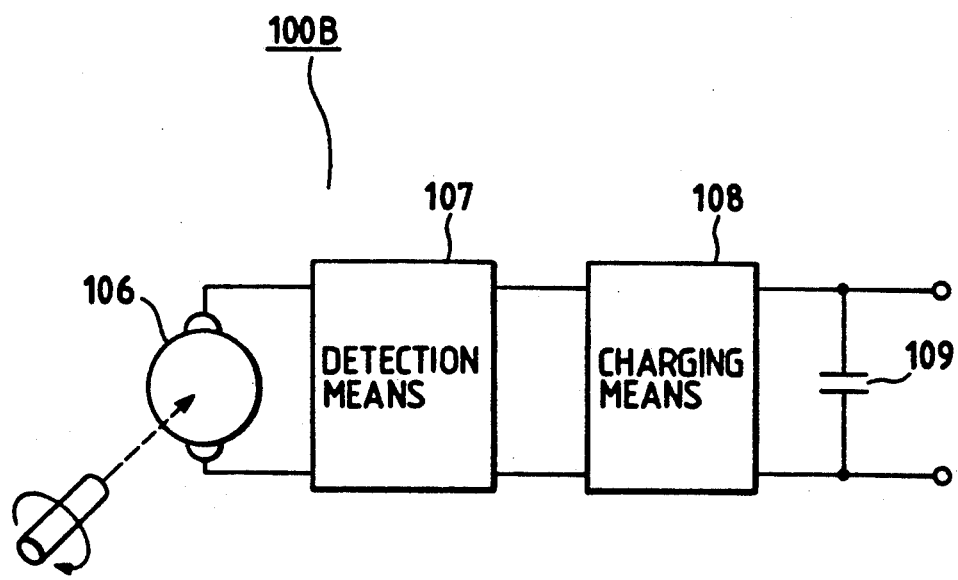
FIG. 2 shows a diagram for explaining the principle of the second aspect of the invention.

In this embodiment, portions corresponding to those of the embodiment of FIG. 2 are correspondingly referenced, and detailed description thereof is omitted. This embodiment of FIG. 4 is different from the embodiment of FIG. 2 in that an electric motor, which is a DC electric motor, is used as a generator G and a revolving body RR (for example, a rotary shaft) is connected to the rotary shaft of the generator G so that a voltage proportional to the revolving velocity of the rotary shaft is generated and in that the bridge circuit is omitted and the terminal of the generator G is directly connected to a first operational amplifier 12.

In such a configuration, it is possible to easily obtain the counted number of revolutions of the revolving body RR in the same manner as in the case of obtaining the number of revolutions of the electric motor.

According to the present invention, there are such advantages that the cost is reduced because the revolution counts of an electric motor (or a revolving body) can be detected by means of a circuit having a simple configuration, and that since the revolution counts is produced in the form of an induced voltage of a capacitor, the revolution counts can be used as it is for performing control.

What is claimed is:

1. An apparatus for detecting revolution counts, comprising:
   detection means for detecting an induced voltage of an electric motor;
   capacitor for storing charges; and
   charging means for charging said capacitor on the basis of said detected induced voltage;
   wherein said charging means includes a current generation circuit for converting said detected voltage into a current as an output current thereof, and a current mirror circuit for producing a charging current equal to said output current.

2. An apparatus for detecting revolution counts as claimed in claim 1,
   wherein said current generation circuit incudes a first operational amplifier for amplifying the induced voltage of said electric motor to output an amplified voltage and second operational amplifier which receives the amplified voltage at non-invert terminal, and
   wherein said current mirror circuit includes an NPN-type first transistor, base terminal of which is connected to an output terminal of said second operational amplifier, emitter terminal of which is connected to an invert terminal of said second operational amplifier, and collector of which is connected to a power source through a diode in forwardly connection, and a PNP-type second transistor, base of which is connected to a connection point between said diode and the collector of the first transistor, emitter of the second transistor is connected to the power source, and collector of the second transistor is connected to said capacitor.

3. An apparatus for detecting revolution counts, comprising:
   voltage generator for generating a voltage corresponding to the revolving velocity of a revolving body;
   capacitor for storing charges;
   detecting means for detecting the voltage generated by said generator; and
   charging means for charging said capacitor on the basis of said detected voltage;
   wherein said charging means includes a current generation circuit for converting said detected voltage into a current as an output current thereof, and a current mirror circuit for producing a charging current equal to said output current.

4. An apparatus for detecting revolution counts as claimed in claim 3,
   wherein said current generation circuit incudes a first operational amplifier for amplifying the generated voltage of said generator to output an amplified voltage and second operational amplifier which receives the amplified voltage at non-invert terminal, and
   wherein said current mirror circuit includes an NPN-type first transistor, base terminal of which is connected to an output terminal of said second operational amplifier, emitter terminal of which is connected to an invert terminal of said second operational amplifier, and collector of which is connected to a power source through a diode in forwardly connection, and a PNP-type second transistor, base of which is connected to a connection point between said diode and the collector of the first transistor, emitter of the second transistor is connected to the power source, and collector of the second transistor is connected to said capacitor.

5. A detecting circuit for detecting the number of times a d.c. motor has completed a revolution, said circuit comprising:
   bridge circuit means for detecting a voltage induced by said d.c. motor;
   amplifying means for amplifying said induced voltage of said d.c. motor;
   a current mirror circuit connected to an output of said amplifying means; and
   a capacitor which is charged by a current supplied from said current mirror circuit;
   wherein a voltage across said capacitor means represents said number of revolution times.

* * * * *